(12) United States Patent
Ota et al.

(10) Patent No.: US 12,359,971 B2
(45) Date of Patent: Jul. 15, 2025

(54) SPECTRAL MEASUREMENT METHOD, SPECTRAL MEASUREMENT SYSTEM, AND BROADBAND PULSED LIGHT SOURCE UNIT

(71) Applicant: Ushio Denki Kabushiki Kaisha, Tokyo (JP)

(72) Inventors: Aya Ota, Tokyo (JP); Toshio Yokota, Kanagawa (JP)

(73) Assignee: Ushio Denki Kabushiki Kaisha, Tokyo (JP)

(*) Notice: Subject to any disclaimer, the term of this patent is extended or adjusted under 35 U.S.C. 154(b) by 640 days.

(21) Appl. No.: 17/653,163

(22) Filed: Mar. 2, 2022

(65) Prior Publication Data

US 2022/0268629 A1 Aug. 25, 2022

Related U.S. Application Data

(62) Division of application No. 16/619,893, filed as application No. PCT/JP2018/021762 on Jun. 6, 2018, now Pat. No. 11,300,452.

(30) Foreign Application Priority Data

Jun. 8, 2017 (JP) .................. 2017-113823

(51) Int. Cl.
*G01J 3/45* (2006.01)
*G01J 3/453* (2006.01)
(Continued)

(52) U.S. Cl.
CPC ................ *G01J 3/45* (2013.01); *G01J 3/453* (2013.01); *G01J 3/457* (2013.01); *G01N 21/35* (2013.01); *G01J 2003/4538* (2013.01)

(58) Field of Classification Search
CPC .. G01J 3/45; G01J 3/453; G01J 3/4531; G01J 3/457; G01J 2003/4538; G01N 21/35
See application file for complete search history.

(56) References Cited

U.S. PATENT DOCUMENTS

| | | |
|---|---|---|
| 3,098,112 A | 7/1963 | Horton |
| 4,828,387 A | 5/1989 | Sawyers et al. |

(Continued)

FOREIGN PATENT DOCUMENTS

| | | |
|---|---|---|
| EP | 2 399 523 A1 | 12/2011 |
| JP | S63-45515 A | 2/1988 |

(Continued)

OTHER PUBLICATIONS

Peter T. S. DeVore, Brandon W. Buckley, Mohammad H. Asghari, Daniel R. Solli, Bahram Jalali, "Near-field and complex-field time-stretch transform," Proc. SPIE 9141, Optical Sensing and Detection III, 91411P (May 15, 2014); https://doi.org/10.1117/12.2050979 (Year: 2014).*

(Continued)

*Primary Examiner* — Kara E. Geisel
*Assistant Examiner* — Jonathon Cook
(74) *Attorney, Agent, or Firm* — Studebaker Brackett PLLC

(57) ABSTRACT

A new spectral measurement technique is provided which enables measurement even if the light to be measured exists for a very short period. In one embodiment, a broadband pulsed light wave whose wavelength shifts temporally and continuously in a pulse interferes with a light wave to be measured. The intensity at each wavelength of the light wave to be measured is obtained using a Fourier transform of the output signal from a detector that has detected the intensity of the wave resulting from the interference. A laser beam from a laser source is converted to a supercontinuum (Continued)

wave by a nonlinear optical element, and a pulse extension element extends pulses of the supercontinuum wave, thus generating the broadband pulsed light wave.

14 Claims, 10 Drawing Sheets

(51) Int. Cl.
  *G01J 3/457* (2006.01)
  *G01N 21/35* (2014.01)

(56) References Cited

U.S. PATENT DOCUMENTS

| | | | |
|---|---|---|---|
| 4,856,899 | A | 8/1989 | Iwaoka et al. |
| 7,821,633 | B2 | 10/2010 | Jalali et al. |
| 9,588,326 | B2 | 3/2017 | Schwedt et al. |
| 9,915,520 | B2 * | 3/2018 | Cable .................. G01B 9/02004 |
| 2009/0073432 | A1 | 3/2009 | Jalali et al. |
| 2012/0236314 | A1 | 9/2012 | Fermann et al. |
| 2014/0133011 | A1 | 5/2014 | Schwedt et al. |
| 2016/0106310 | A1 | 4/2016 | Moriguchi |

FOREIGN PATENT DOCUMENTS

| | | |
|---|---|---|
| JP | S63-081226 A | 4/1988 |
| JP | 2005-532393 A | 10/2005 |
| JP | 2006-145270 A | 6/2006 |
| JP | 2006-162616 A | 6/2006 |
| JP | 2008-002815 A | 1/2008 |
| JP | 2009-516828 A | 4/2009 |
| JP | 2010-223670 A | 10/2010 |
| JP | 2011-242177 A | 12/2011 |
| JP | 2012-042380 A | 3/2012 |
| JP | 2013-205390 A | 10/2013 |
| JP | 2016-024086 A | 2/2016 |
| JP | 2016-077666 A | 5/2016 |
| WO | 2004/004757 A1 | 1/2004 |
| WO | 2007/057820 A2 | 5/2007 |
| WO | 2010/095487 A1 | 8/2010 |

OTHER PUBLICATIONS

Furukawa et al Billion frames per second spectrum measurement for high-repetition-rate optical pulses based on time stretching technique; Real-Time Measurements, Rogue Phenomena, and Single-Shot Applications II Article 100890A (Proceedings of SPIE—The International Society for Optical Engineering; (Year: 2017).*

T. Makino et al., "High resolution single-shot time stretch spectroscopy with wavelength demultiplexer at one billion frames per second," 2017 Conference on Lasers and Electro-Optics (CLEO), San Jose, CA, USA, 2017, pp. 1-2. (Year: 2017).*

An Office Action; "Notice of Reasons for Refusal," mailed by the Japanese Patent Office on Aug. 2, 2022, which corresponds to Japanese Patent Application No. 2019-236935 and is related to U.S. Appl. No. 17/653,163; with English language translation.

International Search Report issued in PCT/JP2018/021762; mailed Sep. 4, 2018.

International Preliminary Report on Patentability and Written Opinion issued in PCT/JP2018/021762; issued Dec. 10, 2019.

Johan Hult et al.; "High Bandwidth Absorption Spectroscopy with a Dispersed Supercontinuum Source"; Optics Express; Sep. 3, 2007; pp. 11385-11395; vol. 15, No. 18; Optical Society of America.

Devore Peter et al.; "Near-field and complex-field time-stretch transform"; Proceedings of SPIE; vol. 9141; May 15, 2014; pp. 91411P (1-7); IEEE; US.

Makino Takeshi et al.; High resolution single-shot time stretch spectroscopy with wavelength demultiplexer at one billion frames per second; 2017 Conference on Lasers and Electro-Optics (CLEO); May 14, 2017; pp. 1-2; The Optical Society; San Jose, California.

Furukawa Hideaki et al.; "Billion frames per second spectrum measurement for high-repetition-rate optical pulses based on time stretching technique"; Proceedings of SPIE; vol. 10089; Feb. 22, 2017; pp. 100890A (1-6); SPIE; US.

An Office Action; "Notice of Reasons for Refusal", mailed by the Japanese Patent Office on Aug. 24, 2021, which corresponds to Japanese Patent Application No. 2019-523952 and is related to U.S. Appl. No. 16/619,893; with English language translation.

The extended European search report issued by the European Patent Office on Aug. 11, 2021, which corresponds to European Patent Application No. 18813792.1-1020 and is related to U.S. Appl. No. 16/619,893.

The partial supplementary European search report issued by the European Patent Office on Mar. 25, 2021, which corresponds to European Patent Application No. 18813792.0-1020 and is related to U.S. Appl. No. 16/619,893.

An Office Action; "Notice of Reasons for Refusal", mailed by the Japanese Patent Office on Jan. 11, 2022, which corresponds to Japanese Patent Application No. 2019-236935 and is related to U.S. Appl. No. 16/619,893; with English language translation.

An Office Action; "Notice of Reasons for Refusal", mailed by the Japanese Patent Office on Jan. 5, 2021, which corresponds to Japanese Patent Application No. 2019-523952 and is related to U.S. Appl. No. 16/619,893; with English language translation.

Lyubov Doronina-Amitonova et al. (Photonic-crystal-fiber Platform for Multicolor Multilabel Neurophotonic Studies; Applied Physics Letters 98253706, Published Jun. 22, 2011); https://aip.scitation.org/doi/10.1063/1.3595419 (Year: 2011).

Hamamatsu develops bright supercontinuum source; Oct. 16, 2018; https://optics.org/news/9/10/27 (Year: 2018).

An Office Action; "Decision of Refusal", mailed by the Japanese Patent Office on Dec. 27, 2022, which corresponds to Japanese Patent Application No. 2019-236935 and is related to U.S. Appl. No. 17/653,163; with English language translation.

An Office Action; "Notice of Reasons for Refusal", mailed by the Japanese Patent Office on Feb. 20, 2024, which corresponds to Japanese Patent Application No. 2019-236935 and is related to U.S. Appl. No. 17/653,163; with English language translation.

* cited by examiner

SPECTRAL MEASUREMENT METHOD, SPECTRAL MEASUREMENT SYSTEM, AND BROADBAND PULSED LIGHT SOURCE UNIT

CROSS-REFERENCE TO RELATED APPLICATIONS

This application is a Divisional of U.S. patent application Ser. No. 16/619,893 filed Dec. 5, 2019, which is the U.S. National Stage of International Application No. PCT/JP2018/021762 filed Jun. 6, 2018, which claims benefit of priority to Japanese Patent Application No. 2017-113823 filed Jun. 8, 2017, the entire contents of which are incorporated herein by reference.

TECHNICAL FIELD

The present invention relates to a technique of spectroscopy.

TECHNICAL BACKGROUND

Spectroscopy, which is the technique to measure light intensity at each wavelength, is utilized widely in material analysis and kinds of researches. A typical spectral measurement system uses a chromatic dispersion element such as diffraction grating. In spectral measuring systems using diffraction gratings, it is required to change the postures of the diffraction gratings according to wavelengths to be measured. Therefore, spectral measurement systems have mechanisms to rotate the diffraction gratings around axes perpendicular to optical axes.

PRIOR-ART REFERENCE

Patent Document

[Patent Document 1] JP, 2013-205390, A

SUMMERY OF THE INVENTION

Problems the Invention Will Solve

A kind of spectral measurement requires that a measurement is completed in a very short period. One example is the case it is necessary to know the spectral light-emitting characteristic of a light emitting object that emits light within a very short period. More concretely, it is required in the analysis of light emission in sparking plugs in engines, and in the analysis of light emission in an explosion within a very short period.

In analyzing such a very-short-period light emission, conventional spectral measurement systems using chromatic dispersion elements have been had difficulty in measuring. This is because it is difficult or impossible to complete a measurement in such a short period. For instance, if it is intended to measure spectrum of light in the wavelength bandwidth of 100 nm (nanometer) in 0.1 nm increments by a conventional spectral measurement system, approximately 0.2 seconds is needed even when quantity of the light is sufficient. If the light is weak, it would need some tens of seconds. In spectral measurement systems using diffraction gratings, the number of integration times is increased to improve S/N. In this case, a measurement would need a much longer period.

On the other hand, the technique called "Fourier spectroscopy" using an interferometer is known as highly-sensitive high-speed spectral measurement method. A typical one is a Fourier transform infrared spectrophotometer (FT-IR) used for componential analysis of organic substance and others.

FIG. 10 is a schematic view of a FT-IR as conventional spectral measurement system. As shown in FIG. 10, the FT-IR employs the configuration of a Michelson interferometer. In the example in FIG. 10, the absorption spectrum of a sample S is measured. A light wave from a broadband continuous, i.e., non-pulsed, light source 91 such as lamp is divided into two waves by a half mirror 92. One wave is reflected on a fixed mirror 93, and the other wave reflects on a movable mirror 94. Each of two waves is returned to the same optical path, interfering with each other. The resultant wave advances through a sample S, being detected on a detector 95.

By detecting the intensity of the resultant wave on the detector 95 as the movable mirror 94 is moved in the direction of the optical axis, an interferogram (resultant wave intensity variation) is obtained. Thus, a spectral profile is obtained by the Fourier transform of this interferogram. In this example, the spectral profile is the spectral absorption distribution for the sample S.

FT-IR have the advantages of shorter measurement time, higher sensitivity and higher resolution, compared to spectral measurement systems using diffraction gratings. In addition, broadband simultaneous measurements are possible. Still, the sweep (motion in the optical axis direction) frequency of a movable mirror 94 is about 10 Hz even in a current high speed model, and usually a measurement needs a few or tens of seconds to carry out the integration some tens or some hundreds of times. Therefore, this technique cannot be used for the spectral measurement of a light emission within a period shorter than it.

Recent years, such fields as researches of material synthesis and combustion process have been demanding spectral measurements in very short periods. However, conventional spectral measurement techniques cannot satisfy this demand.

The present invention was invented in consideration of the described problem in the prior art, and has the object of providing a new spectral measurement technique enabling a measurement even if light to be measured exists within a very short period.

Means for Solution

To solve the described problem, an aspect of the invention is a spectral measurement method comprising interfering a light wave to be measured with a wave of broadband pulsed light where wavelength shifts temporally in a pulse, detecting the intensity of a wave resultant from the interference on a detector, and obtaining the intensity at each wavelength of the light wave to be measured on the basis of the detected intensity.

Further to solve the described problem, another aspect of the invention is a spectral measurement method, wherein the light wave to be measured is one emitted from a light emitting object.

Further to solve the described problem, a further aspect of the invention is a spectral measurement method, wherein the temporal shift of wavelength of the broadband pulsed light is continuous in the pulse.

Further to solve the described problem, another aspect of the invention is a spectral measurement method, wherein the broadband pulsed light is a supercontinuum obtained by causing a nonlinear optical effect on a laser beam from a laser source.

Further to solve the described problem, a further aspect of the invention is a spectral measurement method, wherein the broadband pulsed light is the supercontinuum with an extended pulse width.

Further to solve the described problem, another aspect of the invention is a spectral measurement method, wherein the output signal from the detector is captured by a capturing unit, and the repetition period of the broadband pulsed light wave is not less than the capture period of the capturing unit.

Further to solve the described problem, a further aspect of the invention is a spectral measurement method, wherein the capturing unit is an oscilloscope.

Further to solve the described problem, another aspect of the invention is a spectral measurement method, further comprising making another wave of the broadband pulsed light enter into a detector without interfering with the light wave to be measured, and comparing the output signal from the detector with the intensity of the wave resultant from the interference.

Further to solve the described problem, a further aspect of the invention is a spectral measurement method, wherein the pulse width of the broadband pulsed light is not shorter than 100 ns, the wavelength bandwidth of the broadband pulsed light is not narrower than 100 nm, and the repetition frequency of the broadband pulsed light is not more than 10 MHz.

Further to solve the described problem, another aspect of the invention is a spectral measurement system, comprising
  a broadband pulsed light source unit for emitting broadband pulsed light where wavelength shifts temporally in a pulse,
  an interference optical unit for making a light wave to be measured interfere with a wave of the broadband pulsed light from the broadband pulsed light source unit,
  a detector for detecting the intensity of a wave resultant from the interference by the interference optical unit, and
  a processing unit for obtaining the spectral intensity of the light wave to be measured on the basis of the output signal from the detector.

Further to solve the described problem, a further aspect of the invention is a spectral measurement system, wherein the broadband pulsed light source unit is capable of emitting the broadband pulsed light where the temporal shift is continuous in the pulse.

Further to solve the described problem, another aspect of the invention is a spectral measurement system, wherein the broadband pulsed light source unit has a laser source, and a nonlinear optical element for causing a nonlinear optical effect on a laser beam from the laser source to emit a supercontinuum as the broadband pulsed light.

Further to solve the described problem, a further aspect of the invention is a spectral measurement system, wherein the broadband pulsed light source unit has an extension element for extending pulses of the supercontinuum output from the nonlinear optical element.

Further to solve the described problem, another aspect of the invention is a spectral measurement system, further comprising a capturing unit for capturing the output signal from the detector, wherein the broadband pulsed light source unit is capable of emitting the broadband pulsed light at a repetition period not less than the capture period of the capturing unit.

Further to solve the described problem, a further aspect of the invention is a spectral measurement system, wherein the capturing unit is an oscilloscope.

Further to solve the described problem, a further aspect of the invention is a spectral measurement system, further comprising a referential optical unit for making another wave of the broadband pulsed light enter into a detector without interfering with the light wave to be measured, wherein the processing unit is capable of comparing the output signal from the detector, into which the other wave of the broadband pulsed light has entered by the referential optical unit, with the intensity of the wave resultant from the interference.

Further to solve the described problem, another aspect of the invention is a spectral measurement system, wherein the broadband pulsed light source unit is capable of emitting the broadband pulsed light where the pulse width is not shorter than 100 ns, the wavelength bandwidth is not narrower than 100 nm, and the repetition frequency is not more than 10 MHz.

Further to solve the described problem, a further aspect of the invention is a spectral measurement system, further comprising a marker element capable of making a mark by selectively changing the intensity of the broadband pulsed light at a known specific wavelength in the wavelength band thereof.

Further to solve the described problem, another aspect of the invention is a spectral measurement system, wherein the marker element is an element capable of selectively attenuating the broadband pulsed light at the known specific wavelength.

Further to solve the described problem, a further aspect of the invention is a broadband pulsed light source unit for emitting broadband pulsed light where wavelength shifts temporally in a pulse, comprising a marker element capable of making a mark by selectively changing the intensity of the broadband pulsed light at a known specific wavelength in the wavelength band thereof.

Further to solve the described problem, another aspect of the invention is a broadband pulsed light source, wherein the marker element is an element capable of selectively attenuating the broadband pulsed light at the known specific wavelength.

Effect of the Invention

As described below, according to the disclosed method or system, motion of a mirror such as in FT-IR is not required because a wave of broadband pulsed light where wavelength shifts temporally in a pulse interferes with a light wave to be measured, and a spectrum of the light wave to be measured is obtained on the basis of the detection result of the resultant wave intensity. Therefore, a much higher speed spectral measurement is enabled.

According to the invention, moreover, a measurement is enabled even for a light emission within a very short period.

According to the disclosed method or system, moreover, an easy and no-vacant-wavelength spectral measurement is enabled because the temporal wavelength shift of the broadband pulsed light is continuous.

According to the disclosed method or system, the wavelength-temporally-shifting pulsed light can be obtained in a broader band easily because it is modified from a supercontinuum.

According to the disclosed method or system, moreover, a measurement can be easily optimized by obtaining the broadband pulsed light wave having an optimum pulse width, because the pulse is extended by the pulse extension element.

According to the disclosed method or system, moreover, there is no problem that the resultant wave is not captured partially, because the repetition period of the broadband pulsed light is not less than the capture period in the capturing unit.

According to the disclosed method or system, moreover, observation of the interferogram is enabled because the capturing unit is an oscilloscope.

According to the disclosed method or system, moreover, a highly accurate spectral measurement is enabled without influence of spectral intensity fluctuation of the broadband pulsed light even if exists, because the spectrum of the light wave to be measured is obtained from the resultant wave intensity as compared with the reference wave intensity.

According to the disclosed system, moreover, the correlation of each elapsed time in a pulse and each wavelength is easy, and a highly accurate spectral measurement is enabled in this respect, because the marker element is provided.

According to the disclosed system, moreover, a low-loss spectral measurement is enabled even though the marker element is used.

According to the disclosed broadband pulsed light source unit, the correlation of each elapsed time in a pulse and each wavelength can be carried out easily and accurately, because the marker element is provided.

According to the disclosed broadband pulsed light source unit, moreover, loss of the broadband pulsed light can be lowered even though the marker element is used.

MODE TO PRACTICE THE INVENTION

Figure 1:
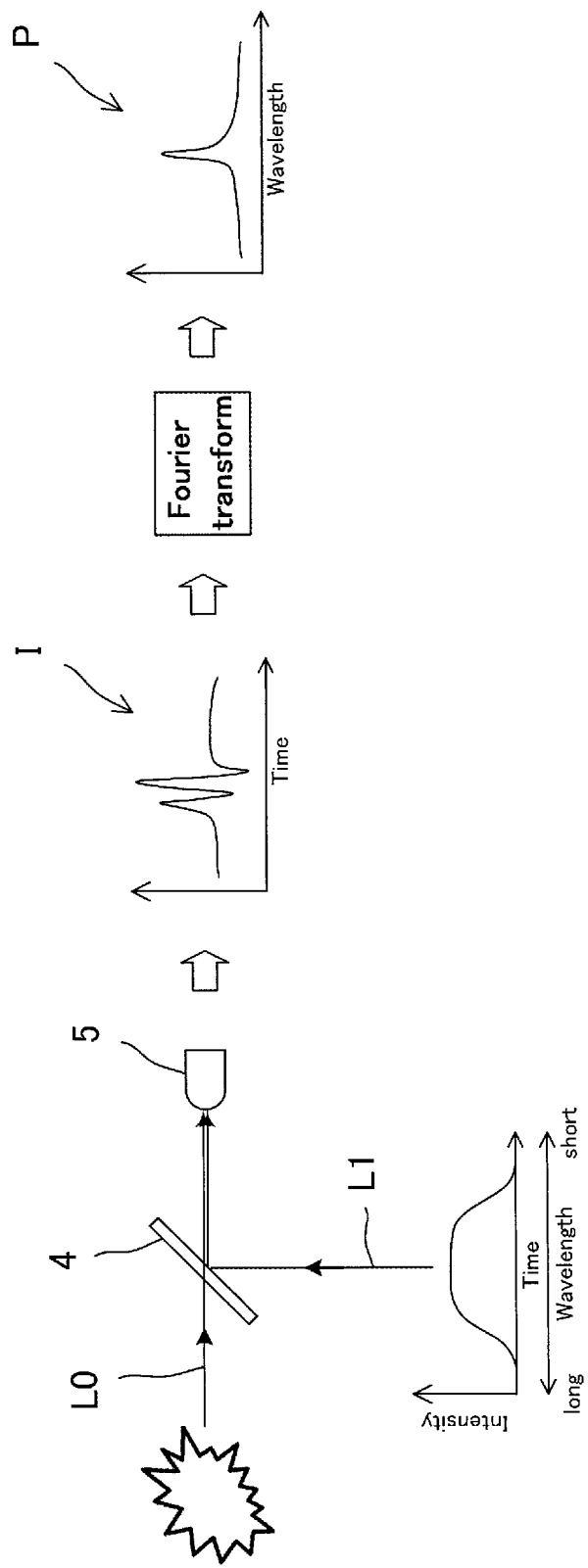
FIG. 1 is a schematic view showing a spectral measuring method in the first embodiment.

Modes to practice the present invention, hereinafter, "embodiments", are described next. FIG. 1 schematically shows a spectral measurement method in the first embodiment. This spectral measurement method utilizes a broadband pulsed light wave L1. "Broadband pulsed light wave" means "light wave where wavelength is distributed in a certain broad band though it is pulsed". In this embodiment, particularly, wavelength of the broadband pulsed light wave L1 shifts temporally.

As shown in FIG. 1, concretely, wavelength of the broadband pulsed light wave L1 shifts temporally and continuously in this embodiment. Wavelength is longer at an earlier time in a pulse, and is shorter at an later time. That is, the light propagates more slowly at a shorter wavelength. Each wavelength is in one-to-one correlation with each elapsed time in a pulse. Therefore, if an elapsed time is specified in a pulse, a wavelength and the intensity at the wavelength is known together. When the intensity of this pulsed light wave is measured on a detector 5, variation of the output appears as time passes in the pulse. This value variation corresponds with the light intensity at each wavelength correlating to each elapsed time when each value is obtained. In a word, the temporal variation of the output value from the detector 5 corresponds with the spectrum.

Such light where the wavelength shift is temporally continuous is called "chirped light". A spectral measurement is carried out using a chirped broadband pulsed light wave L1 in this embodiment.

Figure 2:
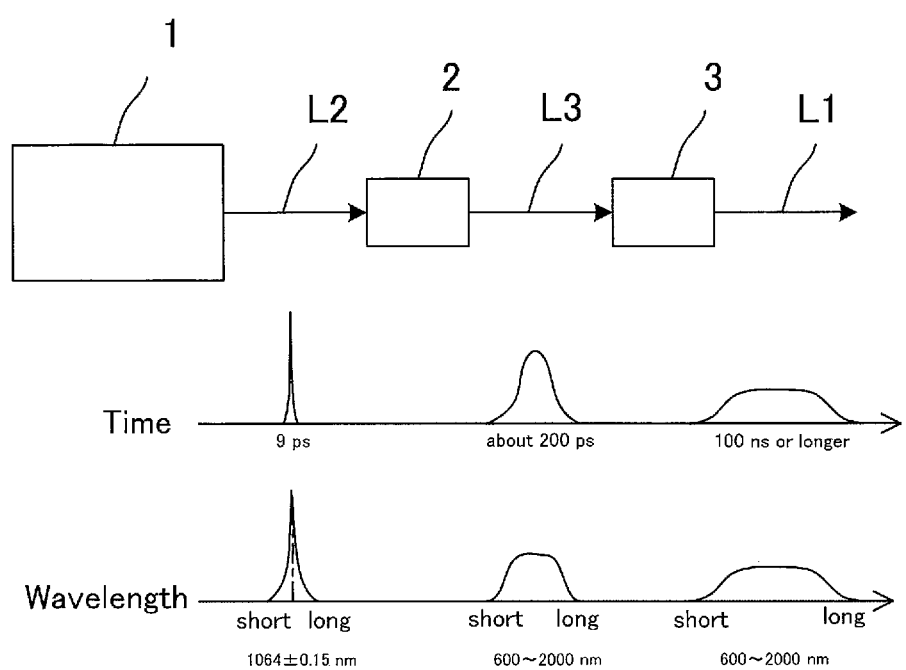
FIG. 2 is a schematic view showing generation of a broadband pulsed light wave in the spectral measurement method.

Generation of the broadband pulsed light wave L1 is described concretely referring to FIG. 2. FIG. 2 is a schematic view showing generation of the broadband pulsed light wave L1.

As shown in FIG. 1, a broadband pulsed light wave L1 is generated on a laser beam L2 from a laser source 1 in this embodiment. A pulsed light is often a laser beam from a laser source. The laser beam L2 is essentially monochromatic, i.e., narrow banded as shown in FIG. 2. In this embodiment, the laser beam L2 from the laser source 1 is made broadbanded by such a nonlinear optical effect as the self-phase modulation. A new wavelength is generated by a nonlinear optical effect such as the self-phase modulation, and thus the laser beam L2 is made broadbanded. Light obtained by broadbanding ultra-short pulsed light by a nonlinear optical effect is known as "supercontinuum", hereafter abbreviated as "SC". The method in this embodiment utilizes a SC wave L3.

In this method, concretely, an optical fiber is used as nonlinear optical element to obtain the SC wave L3. Light waves can propagate long distances in fibers as confined in small regions therein. Accordingly, those has the advantage that a nonlinear optical effect can be caused more easily, compared with bulk type elements.

Thus, pulse extension is applied to this SC wave L3 for an optimization considering an object of spectral measurement in this embodiment. As shown in FIG. 2, the broadband pulsed light wave L1 is emitted as the time width of pulses is extended by a pulse extension element 3.

Figure 3:
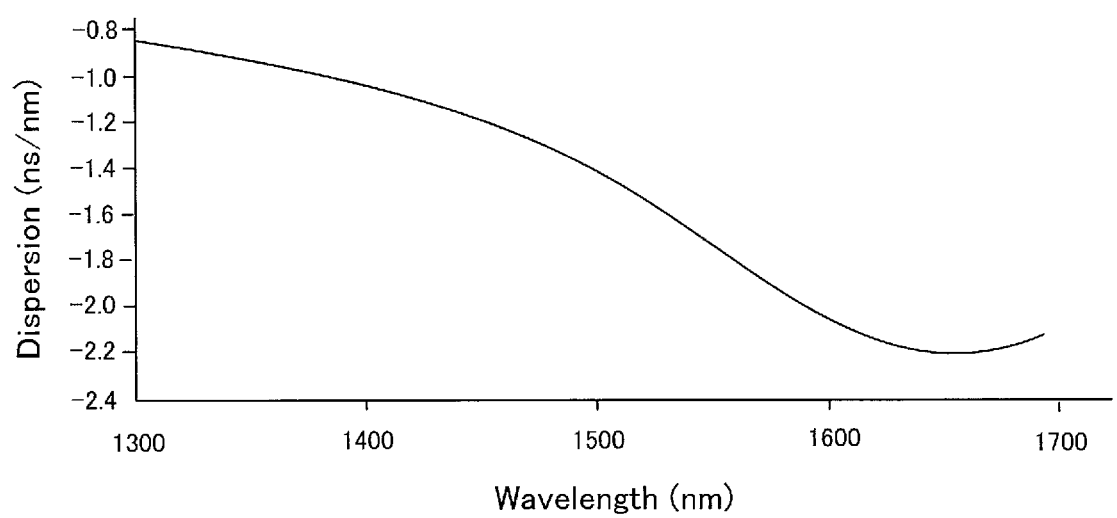
FIG. 3 shows the dispersion characteristic of an optical fiber used as pulse extension element.

A dispersion (group velocity dispersion) element is used as the pulse extension element 3 in this embodiment. An optical fiber is also used as the dispersion element because of easiness in handling, more concretely an optical fiber having a negative dispersion curve is used as the pulse extension element 3. FIG. 3 shows the dispersion characteristic of an optical fiber used as the pulse extension element 3.

In this embodiment, it is assumed to carry out a spectral measurement in the near infrared band about 1100-1600 nm. Though the dispersion at wavelengths less than 1300 nm is not shown in FIG. 3, this optical fiber as the pulse extension element 3 has the negative group velocity dispersion (normal dispersion) within the band about 1100-1600 nm, and has the characteristic where the dispersion increases at longer wavelengths, i.e., has a negative dispersion slope.

Therefore, the pulse width of the SC wave L3 is extended as shown in FIG. 2. The broad wavelength width of the SC wave L3 is maintained, not changing.

As shown in FIG. 2, for instance, a laser beam L2 of 1064 nm in the center wavelength and 0.3 nm in the wavelength width is emitted from the laser source 1. Its pulse width is about 9 picoseconds. This laser beam L2 is converted into a SC wave L3 having the wavelength width about 600-2000 nm broadened by the nonlinear optical element 2, and its pulse width is extended to about 200 ps (picoseconds). The pulse width of the SC wave L3 is further extended to not less than about 100 ns (nanoseconds) by the pulse extension element 3, and thus the broadband pulsed light wave L1 is obtained.

A dispersion compensation fiber (DCF) for telecommunication may have such a dispersion characteristic as shown in FIG. 3, being able to divert. Though single mode fibers with positive dispersion slopes are often used for transmission in telecommunication, fibers having negative dispersion slopes are commercially available as dispersion compensation fibers to compensate wave form distortion. Those may be used in this method.

A general single-mode fiber is sufficient as the nonlinear optical element 2. Still, it is preferable to use one having a normal dispersion characteristic in a measurement wavelength band in view of generating a chirped SC wave L3. It is more preferable that a SC wave L3 is linearly chirped.

Figure 4:
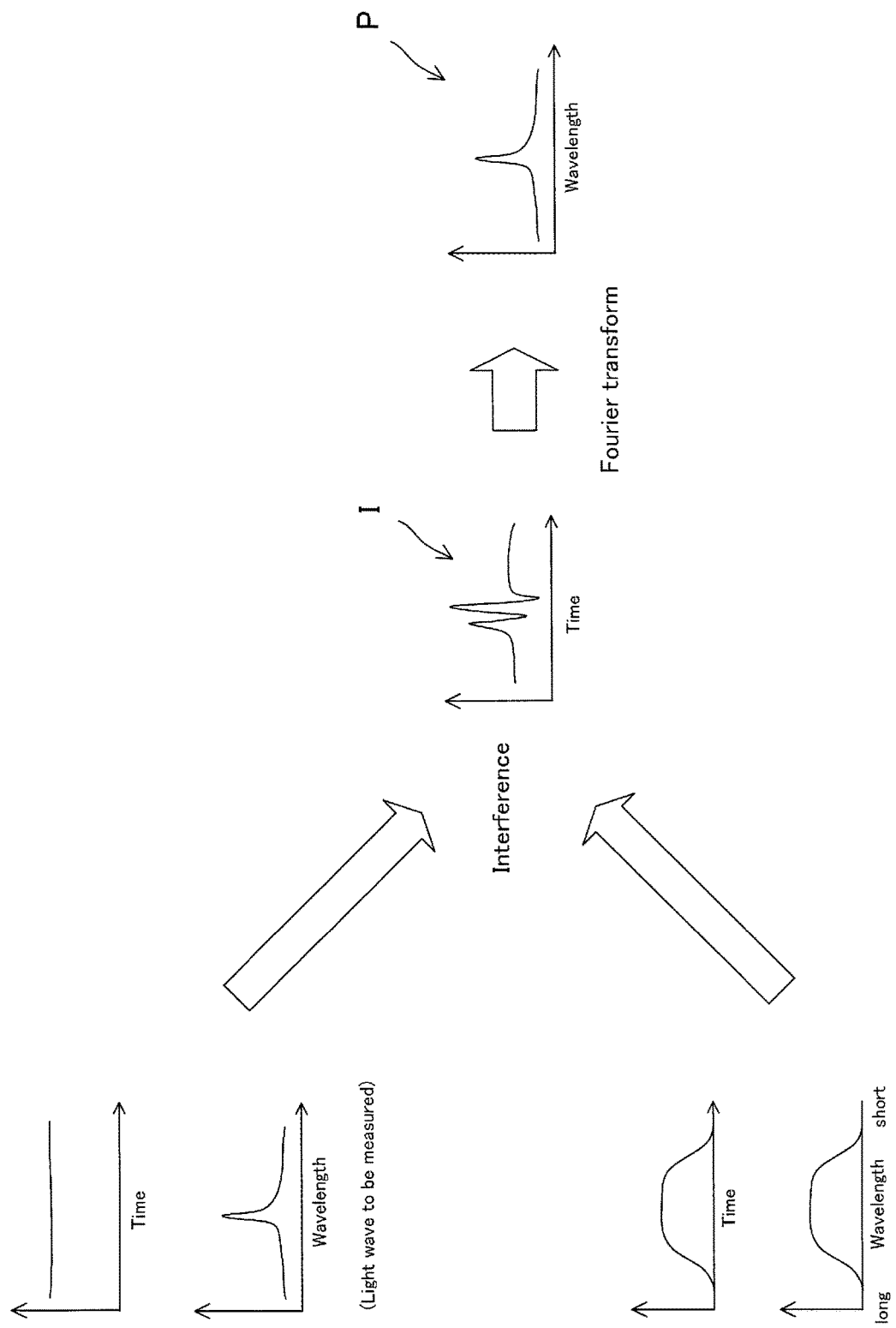
FIG. 4 is a schematic view showing the principle of spectral measurement utilizing interference of a broadband pulsed light wave and a light wave to be measured.

The generated broadband pulsed light wave L1 is made interfere with a light wave L0 to be measured as shown in FIG. 1. It is the principle of this method to carry out a spectral measurement using the broadband pulsed light wave L1 and utilizing optical interference, so much characterizing the method. This principle is described referring to FIG. 4. FIG. 4 is a schematic view showing the principle of spectral measurement utilizing the interference of the broadband pulsed light wave L1 and a light wave L0 to be measured.

FIG. 4 shows intensity distributions as time passes and intensity distributions as wavelength shifts respectively for the light wave L0 to be measured and the broadband pulsed light wave L1. As shown in FIG. 4, it is supposed the light wave L0 to be measured would have the constant intensity in a period sufficiently longer than the time length of one pulse of the broadband pulsed light wave L1, and the spectrum would not change in this period. In addition, the wavelength bandwidth of the broadband pulsed light wave L1 would not be narrower than that of the light wave L0 to be measured When the light wave L0 to be measured advances along the same path as of the broadband pulsed light wave L1, an interference occurs where the wavelengths of the light wave L0 to be measured and the broadband pulsed light wave L1 are close to each other, and the interference amplitude is particularly reinforced where each wavelength equal to each other. The light wave L0 to be measured and the broadband pulsed light wave L1 are superposed to reach the detector 5, which measures the intensity thereof. In this, whereas the wavelength components of the light wave L0 to be measured do not change temporally, wavelength of the broadband pulsed light wave L1 shifts temporally and continuously as described. That is, wavelength is longest initially, and then shorter and shorter as time passes. If the interference occurs, the interference amplitude on the detector 5 increases distinctly at each moment when light of each wavelength, which the light to be measured includes, enters into the detector 5 respectively. In other words, it can be known at which wavelength and in how much extent the interference has occurred by examining the temporal variation (change in one pulse) of the output value from the detector 5.

The resultant wave intensity depends on the spectrum of the broadband pulsed light wave L1. If the spectrum of the broadband pulsed light wave L1 is known, it depends only on the spectrum of the light wave L0 to be measured. Therefore, the spectrum of the light wave L0 to be measured can be obtained by examining the intensity of the resultant wave in the output from the detector 5, and by normalizing it with the known spectrum of the broadband pulsed light wave L1.

Here, the situation where the resultant wave enters into the detector 5 can be dealt as equal to the situation where the wavelength sweep is carried out by moving a movable mirror in the Fourier transform spectroscopy. In a FT-IR, when a movable mirror is moved, the interference amplitude becomes maximum at a position where the phase difference is zero for all wavelengths of a broadband continuous light wave ("continuous" here means "not pulsed"), and then an interferogram can be obtained as a function of the movable mirror position. The whole spectrum in the full wavelength band can be measured simultaneously by the Fourier transform of this interferogram. By contrast, when a broadband pulsed light wave L1 where wavelength shifts temporally is used in this embodiment, an interferogram I is obtained as a function of time. Though whole spectral information cannot be obtained simultaneously, the pulse width of one pulse may be microsecond order in this method, whereas the mirror sweep speed in a FT-IR is about 10 Hz (expressed in the sweep frequency). Thus, time for one-time scanning in the embodiment is 100,000 times shorter, i.e., faster, than that in the FT-IR. If it is required to repeat the integration two or more times, or to measure at two or more points (multipoint measurement), this difference would be critical in the total time for the measurement.

In the embodiment, as described, the temporal intensity variation of the resultant wave detected on the detector is an interferogram I as well as in a FT-IR, and a spectrum is obtained by carrying out the Fourier transform as well as in a FT-IR. Thus, by normalizing this spectrum with the spectrum of the known broadband pulsed light wave L1 (i.e., by dividing at each wavelength) as described, the spectrum P of the light wave L0 to be measured is obtained. The spectral measurement method in the embodiment is based on this principle.

Figure 5:
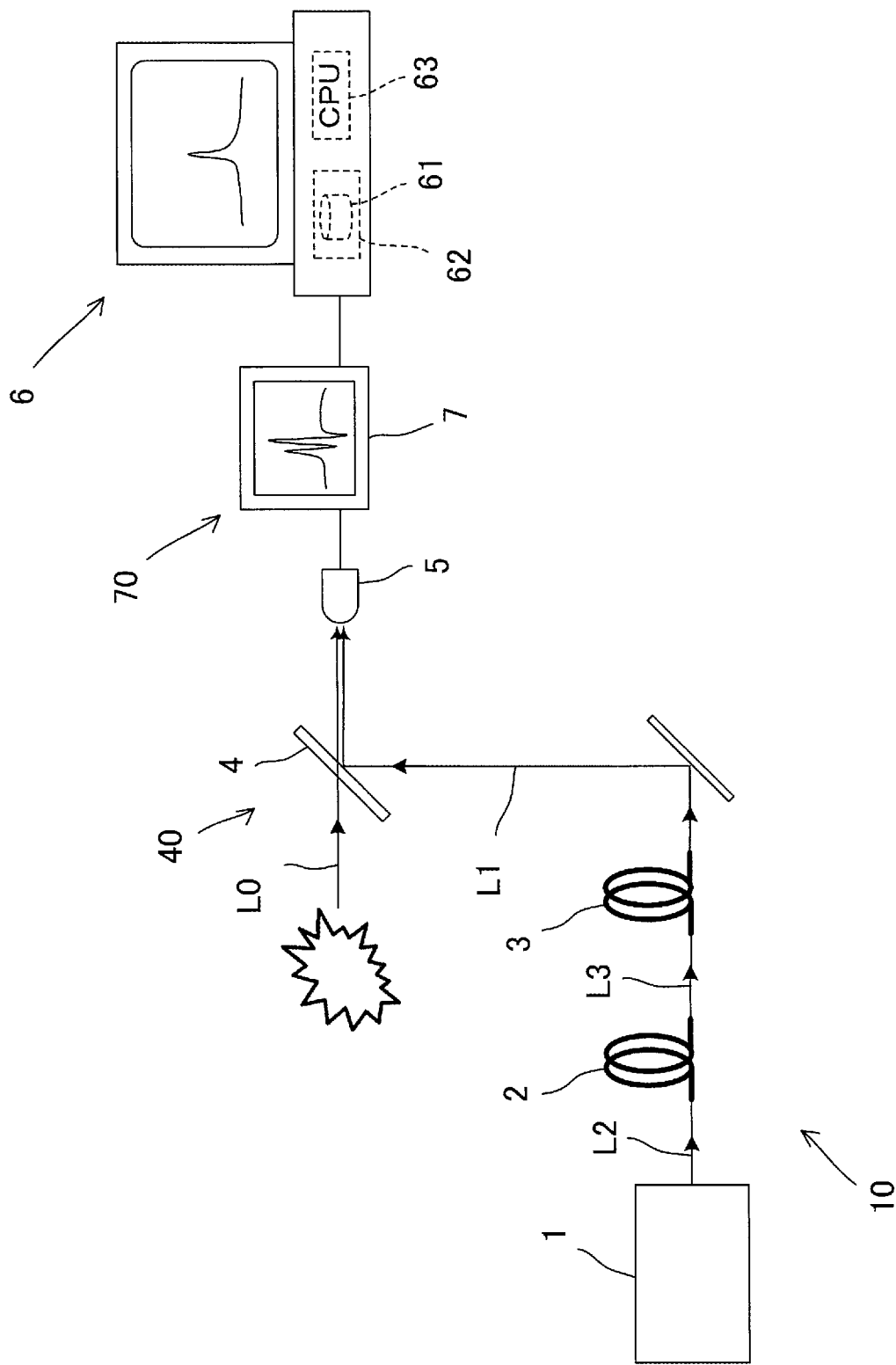
FIG. 5 is a schematic view of a spectral measurement system in the first embodiment.

Next are described spectral measurement systems in embodiments, which carry out the described spectral measurement method. FIG. 5 is a schematic view of a spectral measurement system in the first embodiment.

As shown in FIG. 5, the spectral measurement system in this embodiment has a broadband pulsed light source unit 10 for outputting a broadband pulsed light wave L1, an interference optical unit 40 for making the broadband pulsed light wave L1 interfere with a light wave L0 to be measured, a detector 5 for detecting a wave resultant from the interference of the broadband pulsed light wave L1 and the light wave L0 to be measured, and a processing unit 6 to process the output signal from the detector 5.

The broadband pulsed light source unit 10 has a laser source 1, a nonlinear optical element 2 for generating a SC wave on a laser beam from the laser source 1 by an nonlinear optical effect, and a pulse extension element 3 for extending each pulse of the SC wave.

A femtosecond or picosecond laser source is used preferably as the laser source 1 to obtain a high peak power. For instance, a titanium-sapphire laser or fiber laser can be used. The nonlinear optical element 2 is, for instance, a single mode fiber of about 10 m in length. The pulse extension element 3 is a dispersion compensation fiber module (DCM), which is commercially available.

The interference optical unit 40 includes a half mirror 4. The system may have the configuration where the light wave L0 to be measured is guided by an optical fiber to reach the half mirror 4, or the configuration where it reaches to the half mirror 4 via a slit.

The detector 5 may employ a photodiode such as InGaAs for measurement in a near-infrared region. The detector 5 is preferably a high responsiveness type, which is, for instance, UPD-30-VSG-P of ALPHALAS GmbH, Germany.

The processing unit 6 includes a storage 62 storing a signal processing program 61 for signal processing including the Fourier transform, and a processor 63 operable to execute the signal processing program. The processing unit 6 may be a general-use computer such as PC. The signal processing program executes the Fourier transform of an interferogram. Actually, because of digital processing, it is the discrete Fourier transform.

In this embodiment, a capturing unit 70 is interposed between the processing unit 6 and the detector 5. The capturing unit 70 is an oscilloscope 7 in this embodiment. Instead of the oscilloscope 7, a unit that carries out sampling by a high-speed AD converter may be interposed as the capturing unit.

An amplifier (not shown) is provided between the detector 5 and the capturing unit 70 or in the capturing unit 70. In addition, an AD converter (not shown) is provided between the capturing unit 70 and the processing unit 6, or in the processing unit 6.

The capturing unit 70 may be provided in parallel with the processing unit 6 for the detector 5. In this case, the output signal from the detector 5 is sent directly to the processing unit 6 bypassing the capturing unit 70.

A light wave L0 to be measured interferes with the broadband pulsed light wave L1 from the broadband pulsed light source unit 10, and then the intensity of the resultant wave is detected on the detector 5. The interferogram I that is the temporal variation of the output from the detector 5 is captured into the oscilloscope 7 as the capturing unit 70, and then input to the processing unit 6 from the oscilloscope 7. Required data processing including the Fourier transform is executed by the processing unit 6. As a result, the spectrum P of the light wave L0 to be measured is obtained.

More concretely in this system, a pulse laser of 1064 nm in oscillation wavelength is used as the laser source 1 if about 1000-1600 nm is assumed to be the measurement wavelength range. The pulse oscillation frequency (repetition frequency) is 1.3 MHz, and the pulse width is 5 ps.

The nonlinear optical element 2 may be a single mode fiber such as MF28 of Corning Inc., US, and the pulse extension element 3 may be a DCM such as DCM-G.652 of Fujikura Ltd., Japan.

The spectrum width of the obtained broadband pulsed light wave L1 is 600 nm (1000-1600 nm band), and the pulse width (time width) is about 700 ns. This broadband pulsed light wave L1 enables a spectral measurement for a light wave L0 to be measured in the wavelength band of about 1000-1600 nm.

In the spectral measurement method and the spectral measurement system in the embodiment, it is not required to move a movable mirror such as in FT-IR. This is because the spectrum of a light wave L0 to be measured is obtained by the Fourier transform of the interferogram as a result from the interference of the wavelength-temporally-shifting broadband pulsed light wave L1 and the light wave L0 to be measured.

According to the spectral measurement method and the spectral measurement system in the embodiment, a spectral measurement is enabled even for light existing within a very short period such as an explosion and combustion in an engine, by making the pulse width of the broadband pulsed light wave L1 no longer than the exiting period. In the above example, because the pulse width of the broadband pulsed light wave L1 is 700 ns, a spectral measurement is enabled for a light emission not shorter than 700 ns.

The spectral range of the broadband pulsed light wave L1 preferably covers the assumed spectral range of a light wave L0 to be measured, that is, preferably not narrower than the spectral range of a light wave L0 to be measured. If it is narrower, no measurement result can be obtained outside it. The bandwidth of the broadband pulsed light wave L1 is preferably not narrower than 50 nm around the center wavelength thereof, which is selected according to a light wave L0 to be measured, and is preferably not narrower than 100 nm as a whole.

It is also preferable to integrate values in the pulse repetition of the broadband pulsed light wave L1 to improve S/N in a measurement. That is, as two or more pulses of the resultant wave of the broadband pulsed light wave L1 and the light wave L0 to be measured enter into the detector 5 in the pulse repetition, each integrated value at each wavelength should be the measurement result.

The pulse width of the broadband pulsed light wave L1, which depends on the performance of the pulse extension element 3, is preferably selected in consideration of the start-up time of the detector 5. A detector needs a certain start-up time, which would be picosecond order, until the photoelectric conversion output appears after a light incidence.

Spectral measurement is not enabled in a required wavelength width, if the pulse width of the broadband pulsed light wave L1 is not long enough compared with the start-up time. When a general photoelectric conversion element such as photodiode is employed for the detector 5, the pulse width of the broadband pulsed light wave L1 is preferably 100 ns or more. In other words, the pulse width of the broadband pulsed light wave L1 not shorter than 100 ns brings the merit that no special high-responsiveness detector is necessary.

The repetition period of the broadband pulsed light wave L1 is preferably determined so that overlap of two serial pulses can be avoided with consideration of the pulse width after the extension. When the extended pulse width is a little narrower than 1 is, e.g., 700 ns, as described, the repetition frequency may be about 1 MHz. Moreover, it is preferably determined also with consideration of the start-up response times of the detector 5 and the capturing unit 70. For instance, the overall start-up response time would be 188 ps if the system employs a 5 GHz band photodiode for the detector 5 and a 2 GHz band oscilloscope as the capturing unit 70. Accordingly, the interval between two serial pulses has to be 188 ps or more.

Figure 6:
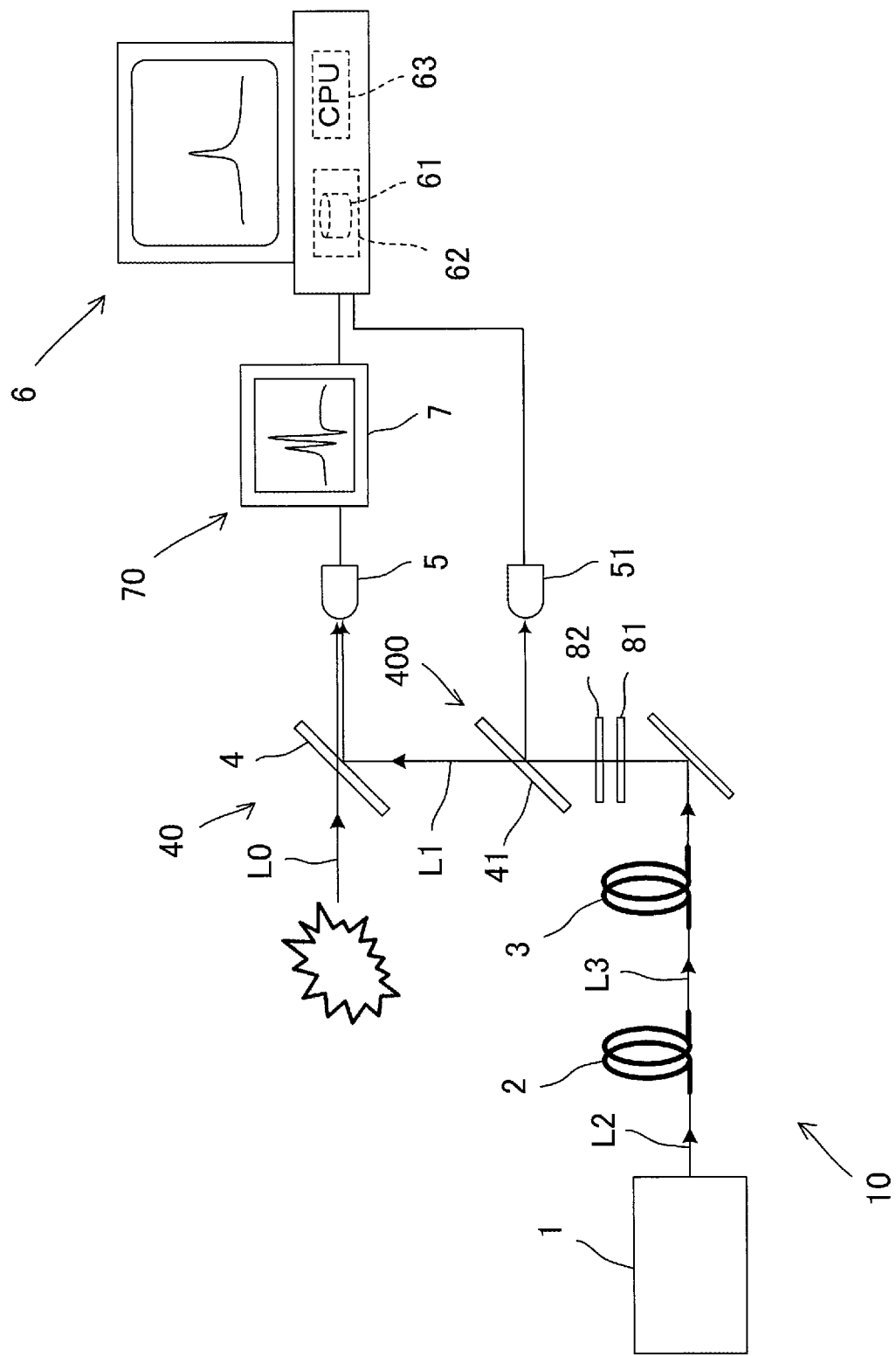
FIG. 6 is a schematic view of a spectral measurement system in the second embodiment.

Next is described a spectral measurement method and a spectral measurement system in the second embodiment. FIG. 6 is a schematic view of the spectral measurement system in the second embodiment.

In the first embodiment, the spectrum of the broadband pulsed light wave L1 was described as already known. This is the configuration where the spectrum of the broadband pulsed light wave L1 is measured in advance, being preset as a constant in the processing unit 6. Though this configuration is practical enough, the spectrum is not a real-time one during a measurement of a light wave L0. If the spectrum of the broadband pulsed light wave L1 is stable, not changing, there is no problem. If changes, however, normalization with a real-time spectrum should be done.

The second embodiment is optimized in consideration of this point. As shown in FIG. 6, a referential optical unit 400 is provided in the second embodiment. Concretely, it has a beam splitter 41 for dividing a broadband pulsed light wave L1 from the broadband pulsed light source unit 10 into two beams. One of the beams reaches a half mirror 4 in the interference optical unit 40 to interfere with the light wave L0 to be measured, and then the intensity of the resultant wave is detected on a detector (the first detector) 5. The other beam enters into a second detector 51 provided in addition to the first detector 5. The output signal from the second detector 51 is amplified by an amplifier (not shown), being input to the processing unit 6 in addition to the signal from the first detector 5. The output of the second detector 51 may be observed on an oscilloscope.

Because temporal variation of the output signal from the second detector 51 also corresponds with the spectrum of the broadband pulsed light wave L1, the processing unit 6 deals it as a referential spectrum after digitizing it with an AD converter (not shown). Thus, the referential spectrum is utilized as a set of values for normalization in calculating the spectrum of the light wave L0 to be measured on the output, i.e., interferogram, from the first detector 5.

According to the second embodiment, because the spectrum of the light wave L0 to be measured is calculated with normalization with a real-time spectrum of the broadband pulsed light wave L1, reliability for the measurement accuracy is improved in this respect. The second detector 51, which may be the same one as the first detector 5, preferably has little fluctuation of the characteristic.

Moreover, the system in the second embodiment employs marker elements that change light intensity selectively at known specific wavelengths within the band of the broadband pulsed light wave L1 for making marks. In this embodiment, notch filters (band cutting filters) 81, 82 that attenuate light selectively at known specific wavelengths are employed as the marker elements. "Attenuation" for the marker elements means "to cut a large amount not to reach a detector", which is not only by absorption but may be by reflection or by scattering.

Figure 7:
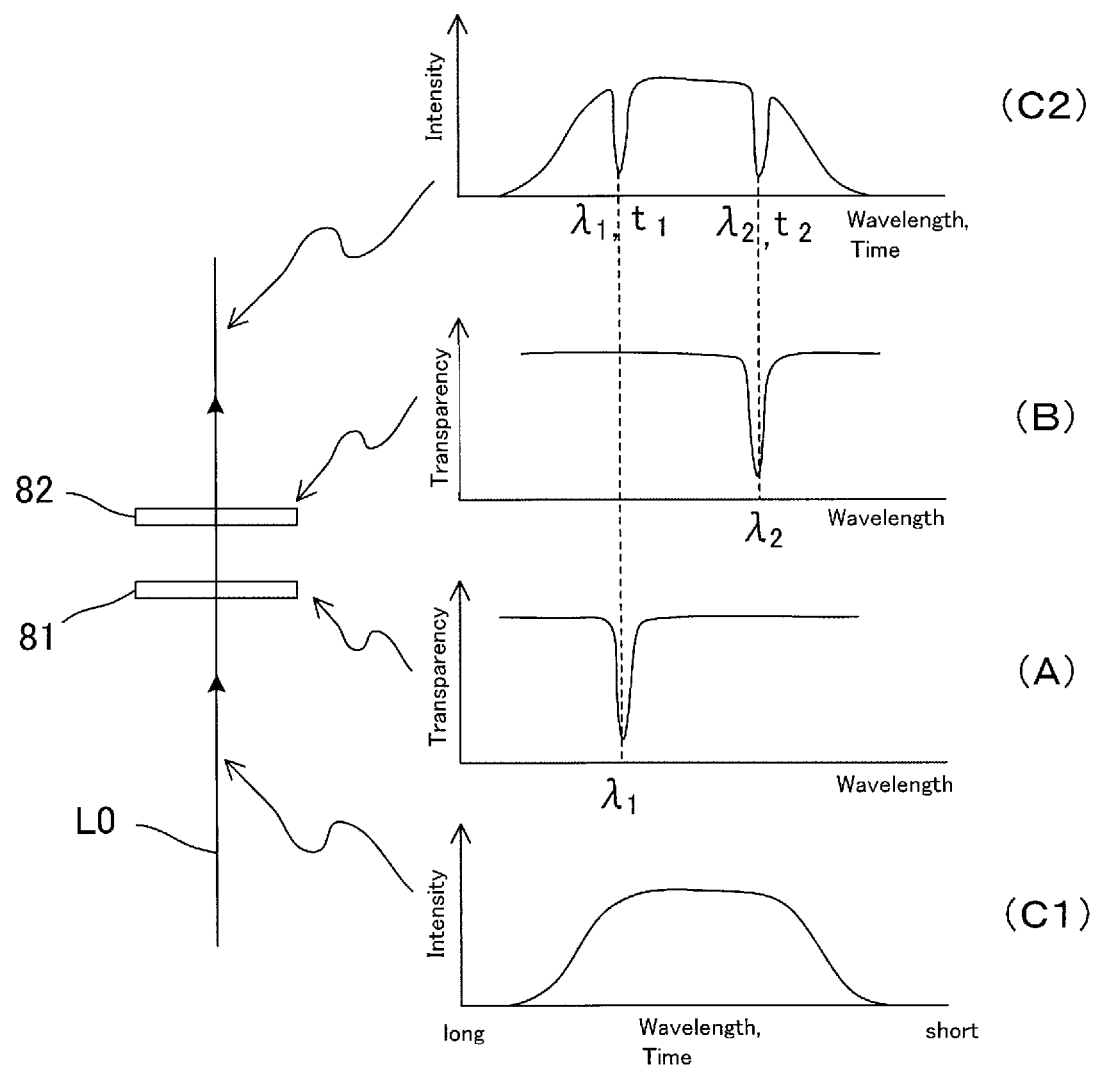
FIG. 7 is a schematic view showing the characteristic and function of a notch filter as marker element.

FIG. 7 is a schematic view showing the characteristic and function of the notch filters 81 and 82 as the marker elements. As shown in FIG. 7, two notch filters 81 and 82 are provided in this embodiment. As shown in FIG. 7(A), the first notch filter 81 is a filter that selectively attenuates light at a longer-side specific wavelength $\lambda 1$ in the band of the broadband pulsed light wave L1. As shown in FIG. 7(B), the second notch filter 82 is a filter that selectively attenuates light at a shorter-side specific wavelength $\lambda 2$ in the band of the broadband pulsed light wave L1. These specific wavelength $\lambda 1$ and $\lambda 2$ are the characteristics of the notch filters 81, 82, being known.

When a broadband pulsed light wave having a spectrum such as in FIG. 7(C1) advances through two notch filters 81 and 82, the intensity decreases steeply at $\lambda 1$ and $\lambda 2$ as shown in FIG. 7(C2). Therefore, those decreases can be marks in correlating each elapsed time in a pulse with each wavelength.

For instance, a broadband pulsed light wave L1 assumedly has the characteristic where a shorter wavelength exits at a later time in a pulse. In this, the time when the first distinct output decrease is observed in the temporal variation of the output from the second detector 51 is t1, and the time when the second distinct output decrease is observed is t2. In this case, t1 is regarded as the time when $\lambda 1$ was detected, and t2 is regarded as the time when $\lambda 2$ was detected ($\lambda 1 > \lambda 2$).

In this case, because there are distinct correlations between $\lambda 1$ and t1, and between $\lambda 2$ and t2, it is possible to deal the intensity at each of other times as the intensity at each of other correlating wavelengths, i.e. spectrum, by using the correlations of $\lambda 1$, t1 and $\lambda 2$, t2 as bases. Each correlation between each elapsed time and each wavelength is possible from a calculation based on the dispersion characteristic of the pulse extension element 3. The dispersion means the difference of wave propagation velocity, i.e., group velocity dispersion, at each wavelength as shown in FIG. 3. In FIG. 3, the dispersion, for instance, at the wavelength 1500 nm is −1.4 ns/nm. This means, if waves at wavelengths of 1499 nm and 1500 nm enter into this pulse extension element 3 at the same time, the wave of 1500 nm delays 1 ns behind the wave of 1499 nm when those come out from the pulse extension element 3. While a broadband pulsed light passes through the extension element 3, the pulse width is extended due to this dispersion. Accordingly, if $\lambda 1$ and t1 by the marker element 81 are determined as the base, it is possible to calculate how much slower light propagates at each wavelength, and it is possible to carry out the correlation of each wavelength and each elapsed time.

In this case, the dispersion in the pulse extension element 3 could change from such a circumstance factor as temperature. The correlation between each wavelength and each elapsed time may change when the dispersion changes. Though it may be one solution to stabilize the temperature by such an element as Peltier device, it would raise the cost of the system. So, there may be another solution where another marker element 82 is inserted to obtain the correlation of another wavelength $\lambda 2$ and another elapsed time t2. The elapsed time t2 is obtained also by the calculation on basis of the correlation of $\lambda 1$ and t1. In this, it is confirmed how much the calculated t2 differs from the t2 observed on the other marker element 82. This difference can be dealt as an index for the data accuracy. If the difference is not small, such a solution as calibration by re-measuring the dispersion of the extension element 3 may be carried out.

Unless the marker elements, correlations would be carried out according to the longest and shortest wavelengths of the broadband pulsed light wave L1. Though this solution would be also effective, it may often be difficult to specify which time is the beginning of a pulse and which time is the ending, because the signals are so week at the beginning and ending as shown in FIG. 1 and others. This difficulty could decrease the measurement accuracy. If the marker elements 81, 82 are used, it is possible to carry out highly accurate spectral measurements stably. After all, though providing two or more marker elements, i.e., specifying two or more detection times of two or more known wavelengths, is preferable, only one marker element could contribute to the improvement of measurement accuracy.

Instead of the notch filters, a fiber bragg grating (FBG) also may be used as the marker element. Though the selective attenuation bandwidths in the notch filters are preferably not more than 1 nm, the demand for such a narrow band characteristic could raise the cost because notch filters are formed of dielectric multilayers. Moreover, narrowbanding of attenuation could cause decrease of light transparency in other bands, increasing the loss.

By contrast, FBG can have narrow-band attenuation characteristics such as 1 nm or less more easily, compared with notch filters. The loss of light outside the band is small. These are because FBG have the refractive index high/low periodically modulated structure along length directions in fibers. If an optical fiber is employed as the pulse extension element 3 for the broadband pulsed light source unit 10, melt bonding of a FBG and the fiber is also possible. So, a FBG is useful for realizing a fiber-based highly homogeneous structure.

Figure 8:
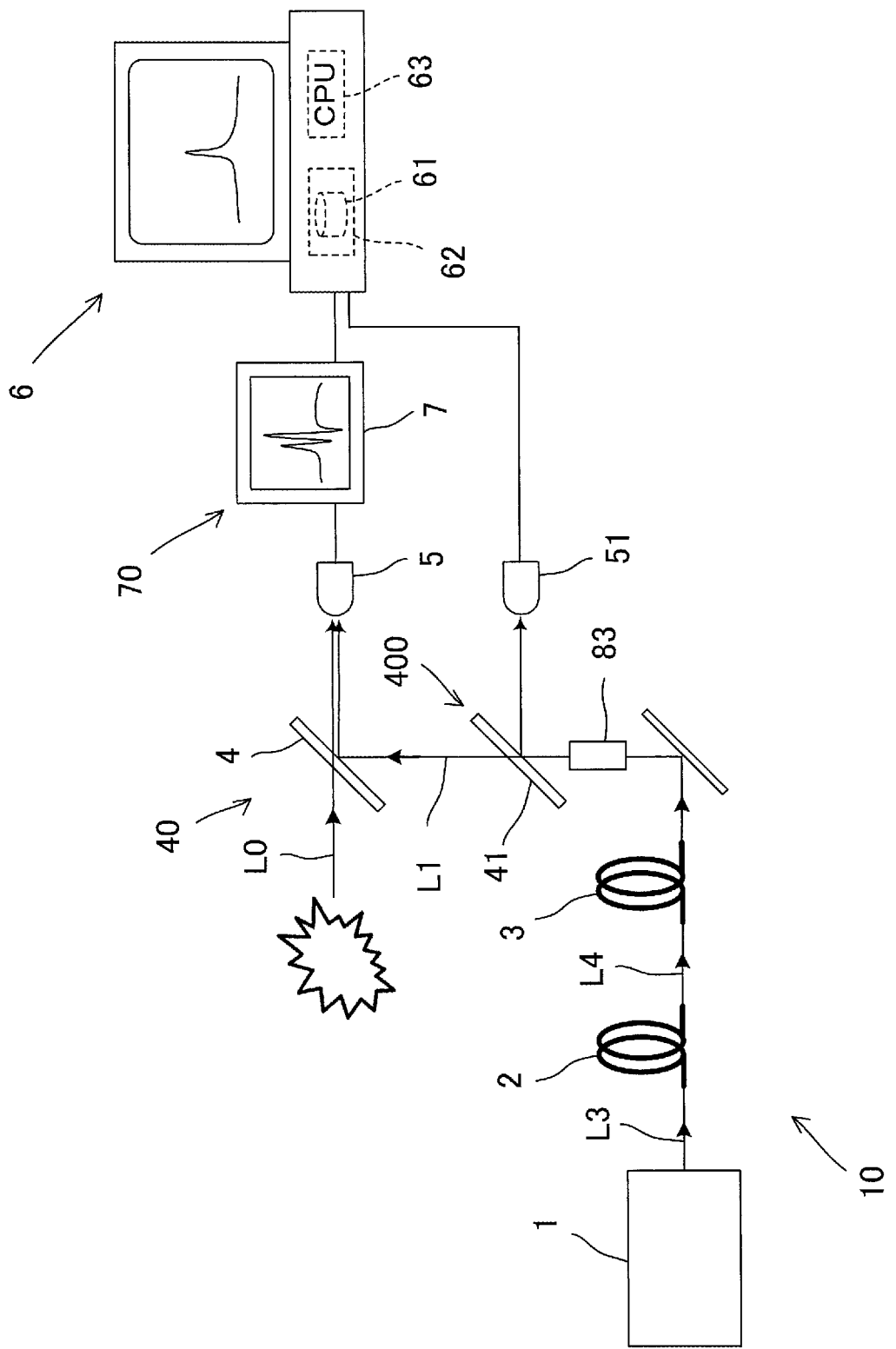
FIG. 8 is a schematic view of a spectral measurement system in the third embodiment.

Next is described a spectral measurement method and a spectral measurement system in the third embodiment. FIG. 8 is a schematic view of the spectral measurement system in the third embodiment.

As shown in FIG. 8, the system in the third embodiment divides a broadband pulsed light wave L1 into two beams on a beam splitter 41, making one beam interfere with a light wave L0 to be measured and making the other beam enter into a second detector 51 for normalization. In the third embodiment, a standard gas cell 83 is used as the marker element instead of the notch filters 81, 82 in the second embodiment.

Figure 9:
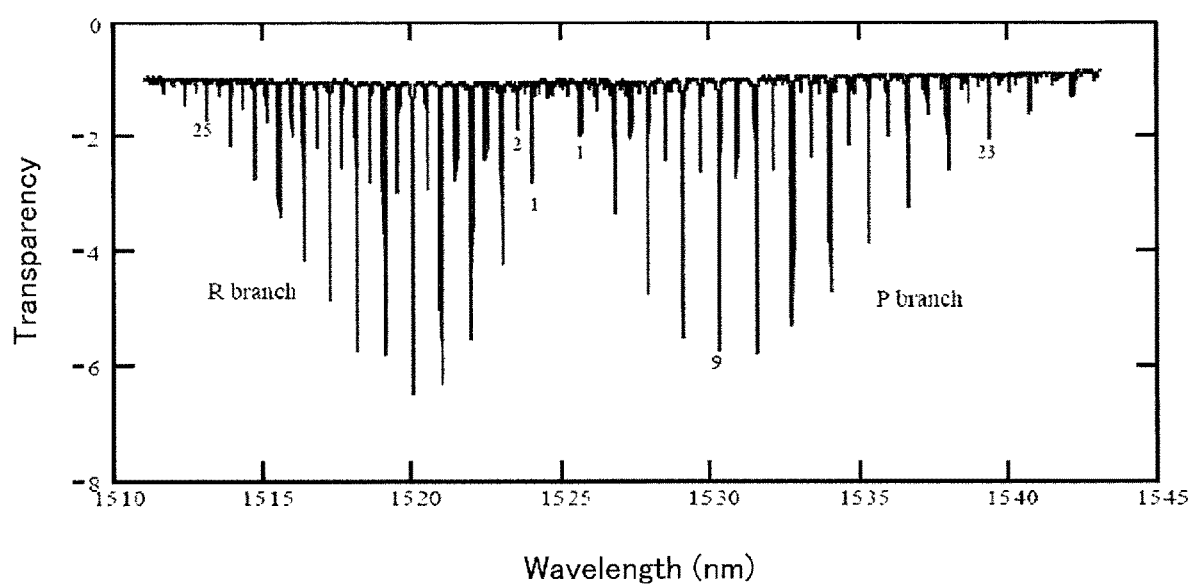
FIG. 9 shows an example of absorption spectra for standard gas cells.
Figure 10:
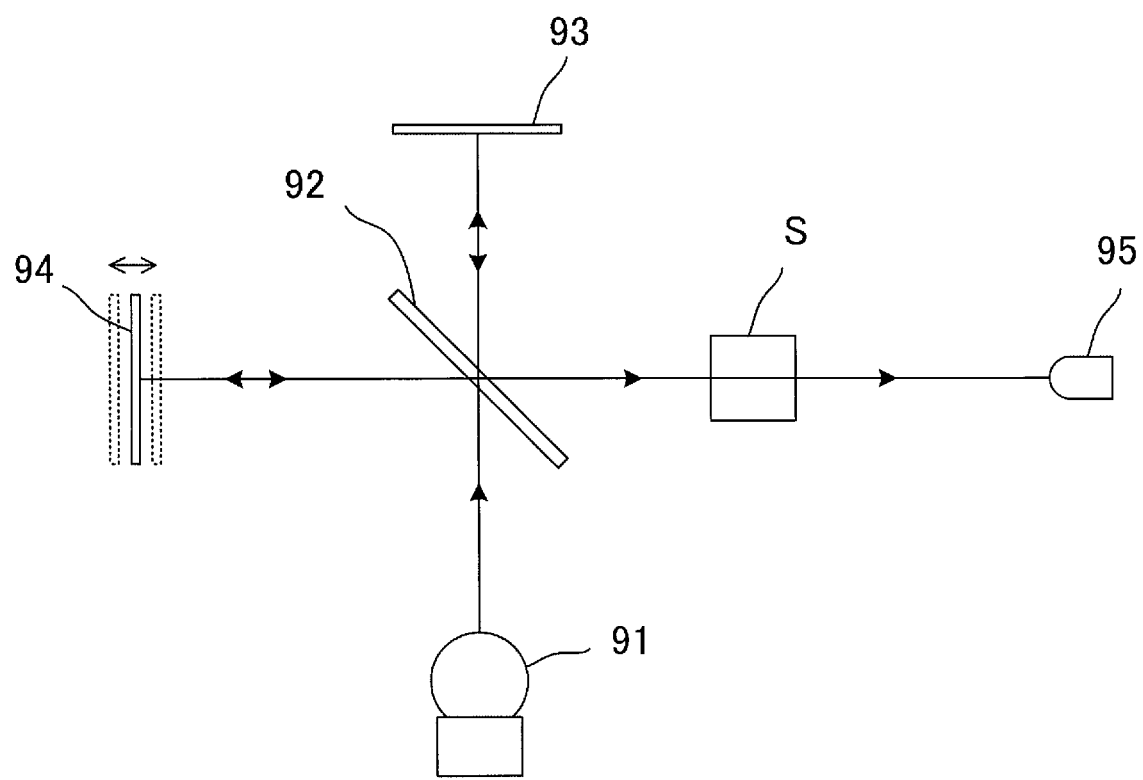
FIG. 10 is a schematic view of a Fourier transform infrared spectrophotometer as conventional spectral measurement system.

Standard gas cells are sealed cells filled with gases of known absorption spectra. Those are used for various wavelength calibrations because of sharp absorption spectral lines inherent to kinds of gases. FIG. 9 shows the absorption spectrum of a standard gas cell as an example. This example is an acetylene standard gas cell (200 Torr in pressure and 3 cm in length) of Wavelength References, Inc., US. A standard gas cell with fibers connected to the inlet and outlet thereof is also commercially available. This type is easy to be connected to the emission end of the broadband pulsed light source unit 10 in this embodiment.

When the broadband pulsed light wave L1 advances through a sample having an intense absorption spectral line at a known wavelength such as standard gas cells, the output from the detector 51 decreases distinctly at the time when a light wave at the known wavelength is captured. Because a standard gas cell 83 has a lot of absorption spectral lines in the spectrum as shown in FIG. 7, it enables the accurate wavelength correction. It should be noted that the measurement accuracy improvement can be expected even if it has at least one known absorption peak wavelength in the spectrum. In the wavelength correction, material for the standard is not always a gas but may be a liquid or solid. Generally, a standard material unit with a material of the absorption spectrum including at least one known distinct spectral line can be used as the marker element.

The configuration where the broadband pulsed light source unit 10 has the marker elements 81, 82, 83 as described may have an advantage in applications other than the spectral measurement utilizing interference of a light wave L0 to be measured. For instance, a light wave from the broadband pulsed light source unit 10 may be irradiated directly to a sample. Thus, a spectral measurement for the sample is carried out by capturing a light wave that has passed through, has reflected on, or has scattered from the sample. Also in this case, it is important to carry out the correlation of each elapsed time in a pulse and each wavelength accurately and easily, the described configuration is much meaningful in this respect.

A marker element may be provided on the other optical path (path of no interference with the wave L0) branching from the beam splitter 41 for the broadband light pulsed light wave L1. In this case, light waves at a known wavelength for the marker element and at other wavelengths could interfere with a light wave L0 to be measured. Therefore, it would be preferable if measurement results are necessary at those wavelengths.

In the described embodiments, though the wavelength shift of the broadband pulsed light wave L1 was temporally continuous, the wavelength shift only needs to be temporal, not needing to be continuous, in realizing the present invention. When a SC wave is generated by causing a nonlinear optical effect on an ultrashort pulsed laser beam, it could be not chirped but temporally discrete. This could happen if the dispersion characteristic of an optical fiber as the nonlinear optical element includes the anomalous dispersion. Even if such a SC wave is extended to obtain a broadband pulsed light wave L1, each wavelength can be specified as far as the correlation of each elapsed time in a pulse and each wavelength is known. Still, a chirped SC wave where the wavelength shift is temporally continuous enables to specify each wavelength easily, being preferable because of no vacant wavelength, i.e., no unmeasurable wavelength.

Though the pulse extension element 3 extends pulses of a SC wave to obtain the broadband pulsed light wave L1 in the described embodiments, other configurations also may be possible. For instance, some kinds of lasers such as titanium-sapphire lasers can have broad oscillation bandwidths of about 200 nm, i.e., about ±100 nm around the center wavelengths. A broadband pulsed light wave L1 can be obtained when output pulses from such a laser source are extended by the pulse extension element 3. In this case, no nonlinear optical effect would be utilized if the peak power is small. However, utilization of a nonlinear optical effect as in the described embodiments can make it easier to obtain a much broader band light wave.

Though the dispersion characteristic of the pulse extension element 3 was normal at all the wavelengths within a measurement range, it may be anomalous partially in the range. Because a pulse is not extended enough in a band around a zero-dispersion wavelength, however, the resolution would be lower due to little time difference among wavelengths. Moreover, if the normal dispersion and the anomalous dispersion are mixed, the one-to-one correlation of time and wavelength might be unable. Therefore, if the normal dispersion and the anomalous dispersion are mixed since the pulse extension element 3 includes a zero-dispersion wavelength in the band of a light wave entering thereto, a wavelength cutting filter is preferably provided on the optical path to the pulse extension element 3 so that the entering wave has only normal dispersion wavelengths or only anomalous dispersion wavelengths.

The pulse extension element 3 may perform a nonlinear optical effect in addition to the described dispersion function. That is, it may be an element that generates a new wavelength by a nonlinear optical effect, i.e., broadens a wavelength band, widening the pulse width simultaneously.

The pulse extension element 3 is not indispensable because a SC wave could have the pulse width long enough without the pulse extension element 3. However, use of the pulse extension element 3 is advantageous in view of making the pulse width much wider and extending it to a required width.

As described, the methods and the systems in the embodiments are suitable for an analysis of light emission in a very short period such as explosion and combustion in an engine. However, the present invention is characterized by the principle where spectral measurement is enabled by interference of a wavelength-temporally-shifting broadband pulsed light wave L1 and a light wave L0 to be measured, not limiting applications in those fields. It may be used in analyzing a longer period light emission, and in measuring spectral characteristic such as spectral absorption and spectral transparency, in addition to light emission analysis.

Though it was described that the bandwidth of the broadband pulsed light wave L1 preferably covers an assumed spectrum of a light wave L0 to be measured, the invention is enabled if it is not. In this case, because the spectrum of a light wave L0 cannot be measured at wavelengths where the spectrum of the broadband pulsed light wave L1 does not cover, the signal processing program 61 is programmed so as to exclude values at those wavelengths from a measurement result.

The notch filters 82, 83 as the marker elements in the second embodiment and the standard gas cell 83 as the marker element in the third embodiment were provided on the path to the second detector 51 that detects the light wave not interfering with the light wave L0 for the normalization. In other configurations as well, notch filters and a standard gas cell may be effective. For instance, if a light wave L0 to be measured has a comparatively flat spectrum profile, a notch filter or a standard gas cell may be provided in the first embodiment as well. In this case, the resultant wave of a light wave L0 to measured and the broadband pulsed light wave L1 can have the intensity distribution where it is distinctly low at a wavelength marked by the notch filter or standard gas cell.

In practicing the invention, the marker element may have a characteristic of attenuating light not at a known specific wavelength but attenuating light at wavelengths other than the known wavelength. Because this type of marker elements would increase the loss of light, however, the characteristic of selectively attenuating at a known specific wavelength is preferable.

DESCRIPTION OF SYMBOLS

L0 Light Wave to be measured
L1 Broadband Pulsed Light Wave
L2 Laser Beam
L3 SC Wave
10 Broadband Pulsed Light Source Unit
1 Laser Source
2 Nonlinear Optical Element
3 Pulse Extension Element
40 Interference Optical Unit
400 Referential Optical Unit
4 Half Mirror
41 Beam Splitter
5 Detector
51 Detector
6 Processing Unit
61 Signal Processing Program
62 Storage
63 Processor
70 Capturing Units
7 Oscilloscope
81 Notch Filter as Marker Element
82 Notch Filter as Marker Element
83 Standard Gas Cell as Marker Element

The invention claimed is:

1. A spectral measurement system, comprising
a broadband pulsed light source unit for emitting broadband pulsed light where each wavelength is in one-to-one correlation with each elapsed time in a pulse as a result of temporal shift of wavelength,
an element disposed at a position to interfere a light wave to be measured with a wave of the broadband pulsed light from the broadband pulsed light source unit, the light wave to be measured being emitted from an object not irradiated with broadband pulsed light, the light wave to be measured not being emitted from the broadband pulsed light source unit,
a detector for detecting the intensity of a wave resultant from the interference by the element, and
a processing unit for obtaining the spectral intensity of the light wave to be measured on the basis of an output signal from by the detector.

2. The spectral measurement system as claimed in the claim 1, wherein the broadband pulsed light source unit is capable of emitting the broadband pulsed light where the temporal shift of wavelength is continuous in the pulse.

3. The spectral measurement system as claimed in the claim 1, wherein the broadband pulsed light source unit has a laser source, and a nonlinear optical element for causing a nonlinear optical effect on a laser beam from the laser source to emit a supercontinuum as the broadband pulsed light.

4. The spectral measurement system as claimed in the claim 3, wherein the broadband pulsed light source unit has a pulse extension element for extending each pulse of the supercontinuum output from the nonlinear optical element.

5. The spectral measurement system as claimed in the claim 1, further comprising
a capturing unit for capturing the output signal from the detector,
wherein
the broadband pulsed light source unit is capable of emitting the broadband pulsed light at a repetition period not less than the capture period of the capturing unit.

6. The spectral measurement system as claimed in the claim 5 wherein the capturing unit is an oscilloscope.

7. The spectral measurement system as claimed in the claim 1, further comprising
a referential optical unit for making another wave of the broadband pulsed light enter into a detector without interfering with the light wave to be measured,
wherein
the processing unit is operable to compare an output signal from the detector, into which the other wave of the broadband pulsed light has entered by the referential optical unit, with the intensity of the wave resultant from the interference.

8. The spectral measurement system as claimed in the claim 1, wherein the broadband pulsed light source unit is capable of emitting the broadband pulsed light where the pulse width is not shorter than 100 ns, the wavelength bandwidth is not narrower than 100 nm, and the repetition frequency is not more than 10 MHz.

9. The spectral measurement system as claimed in the claim 1,
further comprising a marker element capable of making a mark for correlation of wavelength and time by selectively changing the intensity of the broadband pulsed light at a known specific wavelength in the wavelength band thereof,
wherein the processing unit is capable of obtaining the spectral intensity of the light wave to be measured using the time where the known specific wave length is detected on the detector as the base.

10. The spectral measurement system as claimed in the claim 9, wherein the marker element is capable of selectively attenuating the broadband pulsed light at the known specific wavelength.

11. A spectral measurement system, comprising
a broadband pulsed light source unit having an emission characteristic where each of emission wavelengths is in one-to-one correlation with each elapsed time in a pulse as a result of temporal shift of wavelength, an element disposed at a position on a path of a light wave to be measured, the broadband pulsed light source unit being directed to the element to make an emitted broadband pulsed light wave interfere with the light wave to be measured on the element, the light wave to be measured being emitted from an object not irradiated with broadband pulsed light, the light wave to be measured not being emitted from the broadband pulsed light source unit, a detector for detecting the intensity of a wave resultant from the interference by the element, and a processing unit including a processor and a processing program executable by the processor, the processing program including a code for obtaining the spectral intensity of the light wave to be measured on the basis of an output signal from by the detector.

12. The spectral measurement system as claimed in the claim 11, wherein the broadband pulsed light source unit has a laser source, and a nonlinear optical element having a nonlinear optical characteristic where a laser beam from the laser source is converted to a supercontinuum as the broadband pulsed light.

13. The spectral measurement system as claimed in the claim 12, wherein the broadband pulsed light source unit has a pulse extension element having a group velocity dispersion characteristic is negative within the wavelength band of the broadband pulsed light source, and the pulse extension element is disposed at a position where each pulse of the supercontinuum output from the nonlinear optical element enter thereto.

14. The spectral measurement system as claimed in the claim 11, further comprising a marker element disposed at a path of the broadband pulsed light, the marker element having a lower propagation at a known wavelength than at other wavelengths within the wavelength band wherein the processing program includes a code for obtaining the spectral intensity of the light wave to be measured using the time where the known specific wave length is detected on the detector as the base.

* * * * *